United States Patent
Doney et al.

(10) Patent No.: US 6,855,771 B2
(45) Date of Patent: Feb. 15, 2005

(54) PROCESS FOR MAKING BLOCK POLYMERS OR COPOLYMERS FROM ISOTACTIC POLYPROPYLENE

(76) Inventors: Grant Doney, 181 Lakeshore Cir. SE., Acworth, GA (US) 30101; Keith Salsman, 164 Pheasant Run, Hoschton, GA (US) 30548

( * ) Notice: Subject to any disclaimer, the term of this patent is extended or adjusted under 35 U.S.C. 154(b) by 0 days.

(21) Appl. No.: 10/285,268

(22) Filed: Oct. 31, 2002

(65) Prior Publication Data

US 2004/0087724 A1 May 6, 2004

(51) Int. Cl.⁷ ........................ C08L 23/30; C08F 251/00; C08F 255/02; C08F 293/00
(52) U.S. Cl. ........................ 525/263; 525/273; 525/301; 525/191; 525/285; 525/309; 525/322; 525/391
(58) Field of Search ................................. 525/263, 273, 525/301, 191, 285, 309, 322, 391

(56) References Cited

U.S. PATENT DOCUMENTS

| | | |
|---|---|---|
| 3,480,580 A | 11/1969 | Joyner et al. |
| 3,481,910 A | 12/1969 | Brunson |
| 3,856,889 A | 12/1974 | McConnell |
| 3,887,650 A | 6/1975 | Agouri et al. |
| 4,028,436 A | 6/1977 | Bogan et al. |
| 4,032,592 A | 6/1977 | Ogihara et al. |
| 4,578,428 A | 3/1986 | Clementini et al. |
| 4,762,884 A | 8/1988 | Goyert et al. |
| 5,001,197 A | 3/1991 | Hendewerk |
| 5,106,916 A | 4/1992 | Mitchell |
| 5,112,919 A | 5/1992 | Furrer et al. |
| 5,137,975 A | 8/1992 | Kelusky |
| 5,202,386 A | 4/1993 | Hogt et al. |
| 5,247,018 A | 9/1993 | Maeda et al. |
| 5,264,493 A | 11/1993 | Palate et al. |
| 5,266,643 A | 11/1993 | Mustonen et al. |
| 5,310,800 A | 5/1994 | Shimizu et al. |
| 5,523,358 A | 6/1996 | Hirose et al. |
| 5,587,434 A | 12/1996 | McCullough, Jr. et al. |
| 5,705,568 A | 1/1998 | Gahleitner et al. |
| 5,880,241 A | 3/1999 | Brookhart et al. |
| 5,932,660 A | 8/1999 | Meijer et al. |
| 5,969,050 A | 10/1999 | Vandevijver et al. |
| 6,046,279 A | 4/2000 | Roberts et al. |
| 6,218,476 B1 | 4/2001 | Coe |
| 6,331,595 B1 | 12/2001 | Mitchell et al. |

FOREIGN PATENT DOCUMENTS

| | | |
|---|---|---|
| JP | 55012134 | 2/1980 |
| JP | 61211306 | 9/1986 |
| JP | 11228627 | 8/1999 |

*Primary Examiner*—James J. Seidleck
*Assistant Examiner*—Olga Asinovsky

(57) ABSTRACT

A process for manufacturing block polymer or copolymer from isotactic polypropylene. Polyolefins are introduced into an extruder. Free radical generator is mixed with the polyolefins to form a mixture at room temperature for free radical formation. The mixture is brought up to a temperature of between 175° C. to 220° C. Chain degradation of the polyolefins is induced by the free radical formation to form degraded polymer. Alkenically unsaturated monomers or polymer segments are mixed with the degraded polymer to form a second mixture. The temperature of the second mixture may be lowered to a temperature of between 90° C. to 150° C. The temperature of the second mixture is then adjusted to a temperature between 100° C. to 250° C. to form a novel block polymer or copolymer.

18 Claims, No Drawings

PROCESS FOR MAKING BLOCK POLYMERS OR COPOLYMERS FROM ISOTACTIC POLYPROPYLENE

BACKGROUND OF THE INVENTION

1. Field of the Invention

Applicant's invention relates to a process for making block polymers or copolymers from isotactic polypropylene.

2. Background Information

The manufacture of polypropylene and polyethylene has evolved to the point of generating high quantities of specific commodity polymers. Although these polymers have great potential for their specific uses, they are limited in scope for conversion to polymer types with other properties. It is the purpose of the present application to disclose a unique approach to using these polymers, either virgin or recycled, as the building blocks for novel polymers with other properties. These novel polymers can be considered block polymers that contain segments for reactive functionality. This becomes especially important in the recycling efforts for the commodity polyolefin polymers and provides an outlet for the large amount of available recycled material. The method disclosed herein provides a method for obtaining novel block polymers with a wide range of properties such as decreased viscosity, improved flexibility, improved hydrophilic character, and higher molecular weights. In addition this method allows more use of the reactive capabilities of modern extruders. Additionally in this process these polymers can be blended with other polymers to provide compatible exudates. Alone or blended together with other polymers these novel polymers can be used in the production of articles such as fibers, extruded sheets, films, adhesive products, molded products, or other similar articles.

Amorphous or non-crystalline polymers are used extensively for paper, film, and foil laminations and as ingredients for adhesives, sealants, and hot melt formulations. These non-crystalline polymers are chosen and used for the properties of adhesion, flexibility, surface tack, and overall compatibility with the systems in which they are used. In the past amorphous polypropylene was introduced in the adhesive market because it was a by-product of isotactic polypropylene synthesis. With current processing and advances in catalyst technology, the availability of amorphous polypropylene as a byproduct has been virtually eliminated. For their properties, especially strength, other amorphous polymers are commonly used. These include polyethylene, butyl elastomers, and cross linked butyl rubber, styrenic block copolymers (SBC) such as styrene butadiene (SBR) or styrene-ethylene butadiene styrene rubber, ethylene or similar copolymers of vinyl acetates, acrylates, such as methyl methyacrylate, or butylacrylate copolymers, polyisobutylene elastomers or the like.

Regular Extrusion

Many polymers are subjected to an extrusion process. Regular extrusion is a process whereby a polymer is put into the melt state for the purpose of injecting into a mold or pushing the polymer through a dye into a film or formed article state. Direct extrusion consists of mixing polymer with other polymers, additives, colorants, foaming agents, or the like in the extruder itself. This method is generally accepted as a method for making articles and has grown in acceptance as a lower cost method of manufacturing over the last several years. Within the last ten years or so a method termed as "reactive extrusion" has shown up in industry outside of the conventional chemical plants where polymers are manufactured for resale. In this process the polymers are put in an extruder with other ingredients and a reaction occurs producing a polymer chemically different from the original. There are a wide variety of processing parameters that can be controlled by the extruder design and setup such as heating, venting, pressurizing, and depressurizing zones as well as multiple ports for addition of additives. Reactive extrusion is the technique utilized in the present invention.

Polymer Incision or Degradation

In utilizing reactive extrusion, degradation of the polymer is often necessary. There are two basic types of degradation of polymers: (1) degradation starting from the chain ends (i.e. the opposite of a polymerization reaction where one monomer residue after the other is split off from the chain ends); and (2) statistical degradation, where a bond is split somewhere at random in the chain so that fragments result, which on an average of one split per molecule, are half as large as the staring molecules. Whether the first or second type occurs is easy to follow based on the presence of monomers in the first type or the reduction in molecular weight or viscosity in the second type.

Degradation can occur by the presence of free radicals in the process. It is well known in the art of polymer chemistry that the decomposition of peroxide compounds results in the generation of these free radicals. These free radicals can do two things depending on the process conditions, they can either (1) form new covalent bonds by reacting two unsaturated groups together or (2) break a covalent bond. The degradation of polyolefins by peroxide decomposition is easy to follow by following the reduction in viscosity or increase in melt flow index.

Peroxide decomposition in the presence of polyolefins produces free radicals that allow other reactive alkenically unsaturated materials to react with the polyolefins. If no alkenically unsaturated materials are available however these peroxide decomposition radicals will also cause chain scission or statistical degradation of the polyolefins if not purposely avoided by process conditions. A polyolefin, polyethylene, can react with itself and cross link or be degraded depending upon conditions. This crosslinking or grafting reaction can be caused by the formation of an unsaturated bond in the polyethylene that can react with another activated unsaturated bond from other polyethylene molecules. It is therefore known to add "grafting monomers" at the same time as the free radical generators in order to minimize the decomposition reaction in favor of the grafting reaction.

The functionalization of polypropylene through maleation is currently well known and practiced in the industry for grafting monomers. The polyolefin is melted and maleic anhydride and peroxide are added together with agitation. Using maleic anhydride gives the greatest degree of carboxylic acid modification with the least amount of polymer modification that can lead to excessive degradation by chain incision of the polyolefin molecule. The degree of functionalization is measured by the acid number and becomes important for the purpose of melt blending with other polymers for compatibilization.

Block Polymers

This grafting reaction can produce various types of polymers. One type is the graft polymer which is a polymer with branches whereby the main chain is chemically different from the branches. Another type of polymer that can be formed is the block polymer. A block polymer is a polymer whereby the molecules have blocks connected linearly. With the block polymer the polymer has segments along its chain that are chemically different from adjacent segments. The blocks are connected directly or through a constitutional unit that is not part of the blocks. The blocks in the block polymer are regular and of the same species. With a block copolymer the blocks are of different species. Block polymers or copolymers can be formed in one of two possible ways: (1) copolymerization of a second monomer onto an existing polymer chain during formation or (2) combining preformed polymer chains with other polymer chains with the aid of functional groups. This second type of block polymer or copolymer formation is the subject of the present invention.

Polypropylene

In the preferred embodiment of the present invention these block polymer or copolymers are formed from polypropylene, most preferably isotactic polypropylene. Polypropylene is a polymer that is well used in the industry for a variety of construction needs. Propylene, a three carbon molecule, is polymerized through the unsaturated two carbons with the third carbon not participating in the reaction and producing a pendent methyl group. Polypropylene is classified and characterized by the position of these pendent methyl groups on the polymer chain. There are currently four known types of polypropylene: (1) atactic polypropylene, (2) isotactic polypropylene, (3) syndiotactic polypropylene, and (4) elastomeric homopolypropylene.

Atactic polypropylene (APP) is polypropylene with the pendent methyl groups arranged randomly along the backbone of the polymer. This configuration results in an amorphous, soft, sticky, and low molecular weight polymer of low strength. Atactic polypropylene was first produced as a by-product but is now produced purposely due to its common use in adhesives, sealants, asphalt modifiers, and roofing applications. It is unsuitable as a raw material for fiber or film.

Isotactic polypropylene (IPP) is polypropylene with all of the pendent methyl groups oriented in one direction to the polymer molecule. This is commonly referred to as stereoregular configuration. Isotactic polypropylene is manufactured for its high level of crystallinity and possible molecular weight. It is useful in applications where higher strength properties are needed. This higher crystallinity results in lower adhesion and lower compatibility with non-olefin type polymers.

Syndiotactic polypropylene (SPP) is polypropylene with the pendent methyl groups oriented in alternate regular configuration to the polymer molecule. This is a commercially available type but is considered a specialty polymer and is not widely used.

Elastomeric homopolypropylene (EHPP) is polypropylene where the segments of polymer molecule pass from stereoregular to random and back along the chain. This material is said to provide a combination of APP and IPP properties. As of 2001 it is not commercially manufactured in the industry.

Nearly all suppliers of polypropylene have switched to the super high activity catalysts. These catalysts offer very high stereospecific, crystalline polypropylene that gives improved properties such as stiffness and strength. This has led to high sales and use of these polymers in recent years. In fact these polymers are heavily used in the fiber industry for their strength, resistance to staining, durability and low cost. It is the growth of this industry and wide spread acceptance of this material that have been the source of the work of the present invention.

With the high demands and improved processes for manufacturing high molecular weight isotactic polypropylene this specific material has become the major available recycled polypropylene. However because of its high crystallinity and low adhesion properties the end use of this material, either virgin or recovered from recycling sources, is highly limited. There are many applications where properties not specifically inherent in isotactic polypropylene but inherent in other types of polypropylene such as atactic polypropylene or elastomeric homopolypropylene are needed. It therefore becomes desirable to convert isotactic polypropylene into a block polymer or copolymer having other characteristics. The present invention provides for a process for making block polymers or copolymers from isotactic polypropylene.

SUMMARY OF THE INVENTION

It is an object of the present invention to provide a novel process for making block polymer or copolymer from isotactic polypropylene.

Another object of the present invention is to provide a process using various methods or techniques to produce novel block polymers containing polyolefin segments from virgin or recycled sources along with a diverse variety of other segments, either monomeric or polymeric, that provide a wide range of functionality to the finished block polymers.

It is a further object of the present invention to provide a novel process for the manufacture of block polymers using reactive extrusion where the entire conversion process can be done within an extruder thus producing the polymers as readily usable functional exudates without the need for intermediate isolation.

Still another object of the present invention is to provide a novel process that utilizes isotactic polypropylene as the source of polyolefin segments in these block polymers or copolymers.

Yet another object of the present invention is to provide a novel process that can be used to produce polymers that can be applied to a variety of manufacturing processes including but not limited to fiber, film, sheet, molded articles, foamed articles, etc.

An additional object of the present invention is to provide a novel process that can be used to produce block polymers whereby the block polymer exudates are used in forming backing for conventional carpet.

Still another object of the present invention is to provide a novel process that provides an alternate approach to the current concept of recycling.

DETAILED DESCRIPTION OF THE PREFERRED EMBODIMENT

In the present invention, chain incision was induced in the polyolefin molecule. By reducing the molecular weight to lower segments the molecule was modified in ways that are completely different from those obtained by grafting reactions alone. The reactions of the present invention can be carried out in a reactor or an extruder, being preferably an extruder, using various amounts of peroxide or other free radical producing compounds. However, the amount of chain incision is monitored and once the polyolefin has been degraded extensively to a certain point, a monomer or monomers along with additional free radical generators are fed into the extruder at temperatures that favor addition such that molecular weight buildup occurs. In this way a block polymer is obtained having segments or side chains of the added monomers adjacent to segments of the original polyolefin i.e. a block copolymer.

The melt index of polyolefins has become a familiar term used to identify the molecular weight of thermoplastic polymers. It is basically the number of grams that can be forced through a 0.0825 inch orifice in 10 minutes at 190 degrees Centigrade by a pressure of 2160 grams. Very high molecular weight polymers have very low melt index numbers while conversely low molecular weight polymers have high melt index numbers. The degradation or chain incision of the polyolefin by free radicals is monitored by the increase in melt index. In this process it is advantageous to substantially increase the melt index to values that would make the polymer unsuitable for most applications.

Therefore, the first step in this process is to degrade the molecular weight of the polyolefin as monitored by the increase in melt index. The polyolefin is mixed with a free radical generator chosen from, but not limited to, the organic peroxides such as alpha, alpha-bis(t-butylperoxy) diisopropylbenzene, bis-(2,1,1-dimethylethyl) peroxyisopropyl)-benzene, di-cumyl peroxide, 2,5-dimethyl-2,5 di(t-butylperoxy)hexane, 2,5-dimetnyl-2,5-di (t-butylperoxy)hexyne-3, di-t-butyl peroxide, di-t-amyl peroxide, 1,1,-di(t-amylperoxy)cyclohexane, 2,2 di-(t-amylperoxy)propane, di-t-butyldiperoxyphthalate, 2,2-di(t-butyl peroxy)butane, 1,1-di(t-butylperoxy)cyclohexane, 1,1-di(t-butylperoxy)-3,3,5 trimethylcyclohexane, ethyl-3,3-di (t-amyl peroxy)butyrate, ethyl-3,3-di(t-butylperoxy) butyrate, n-butyl-4,4-bis (t-butylperoxy)valerate, t-amylperoxy acetate, t-amylperoxy acetate, t-amylperoxy benzoate, t-butylcumyl peroxide, t-butyl peroxy acetate, or t-butyl peroxy benzoate. The peroxide and polyolefin are mixed together at room temperature and the mass is brought up to between 175 and 220 degrees Centigrade. The melt index rapidly changes once the degradation temperature of the organic peroxide is reached. In this way, melt indexes increase from the range of 4 to 20 to about 900 to 2500. The reaction is continued until the peroxide free radical generator has been spent.

At this point it is advantageous in an extruder to lower the temperature to a level that is well below the reaction temperature of the first step, from 90 to 150 degrees Centigrade. This is done to insure that the alkenically unsaturated monomer or polymer added has a chance to mix in with the mass of the polymer segments prior to second stage free radical generation. Examples of the alkenically unsaturated monomers are chosen but not limited to those of the following order: unsaturated organic acids such as acrylic acid, methacrylic acid, ethacrylic acid, itaconic acid, maleic acid, maleic anhydride, fumaric acid, or derivatives of these such as ethyl acrylate, methyl methacrylate, methoxy methyl methacrylate, butyl acrylate, chloroethyl methacrylate, b-diethyl amino methacrylate, methacrylonitrile, acrylamide, methacrylamide, the vinyl carboxylates such as vinyl formate, vinyl chloroacetate, vinyl butyrate, vinyl laurate, the unsaturated aldehydes and ketones such as methacrolein, methyl vinyl ketone, and unsaturated esters such as vinyl ethyl ether and vinyl isobutyl ether.

Since the boiling points of some of these monomers are quite low it is sometimes necessary to run the reaction under pressure. Examples of unsaturated polymers are those obtained from the reaction of other functional groups of the unsaturated monomers that preserve the alkenic unsaturation. These may be esters or amides of the aforementioned acids.

More free radical generator is added and the reaction is then brought up to the temperatures in the range of 100 to 250 degrees Centigrade. The reaction is monitored by lowering the melt flow index back to the range of 4 to 500 or preferably 4 to 100 depending on the application for the new polymer.

If these steps are performed in an extruder one can take advantage of the multiple heating and addition zones. For example, the polyolefin and free radical generator can be added at the feed throat of the extruder, brought up to 175 to 220 degrees in the first zone, and once the appropriate degradation has occurred the reactive alkenically unsaturated monomer or polymer can be added by pumping into a subsequent side feeder. More free radical generator is added and the molecular weight buildup occurs as monitored by a decrease in melt flow index back to the range of 4 to 500 or preferably 4 to 100 depending on the application needs.

If great care is given to the radical generator type and its decomposition temperature and half-life, advantage can be taken of the unspent portion of the generator. In other words with care it is possible to use reaction zones and merely add the alkenically unsaturated material at the right point and temperature to produce the desired block copolymers. With the alkenically unsaturated reactant present at the specific point, radical initiation and chain growth is favored over degradation. The reaction is monitored by the return of viscosity or decrease in melt flow index. In this way several types of novel polymers can be made.

Using this technique it is possible to use higher amounts of functionalizing agents because the polyolefin polymer is rebuilt and degradation by chain incision is not the issue. Due to this factor the process is not limited to small amounts of reactive monomers and in fact large amounts in the order of greater than 50% by weight of modifiers can be used to highly modify the polyolefin. Of course at this point nomenclature becomes an issue and the polymer needs to be named according to its monomer content.

Adducts of the aforementioned alkenically unsaturated monomeric acids and reactants that provide an increase in hydrophilic character are particularly useful for their adhesive properties. The preferred reactants in this process include but are not limited to glycols of the kind used in polymer synthesis such as ethylene glycol, propylene glycol, glycerin, sorbitol, neopentyl glycol, pentaerythritol, butanediol, hexanediol, cyclohexane dimethanol, trimethylol propane, primary and secondary amines such as ethanolamine and/or diethylanolamine, hexamethylene amine, dimethylamino methyl amine, morpholine, propanolamine, and the like.

A particular novel group of new block polymers can be made using this technique if the alkenically unsaturated polymer is an ester or amide of an alkenically unsaturated acid and an adduct of ethylene oxide or propylene oxide or combinations of the two, for instance the ester of acrylic and PEG 400 (polyethylene glycol with a molecular weight of 400). Many such PEGs are available and can vary in molecular weight from 100 to 20,000. The block polymer thus obtained has polyolefin segments adjacent to extensions of polyoxyethylene units. Varying the amount and length of these chains allows one to build in as much or as little hydrophilic character as needed into the hydrophobic polyolefin.

Another approach to this method is to use the diester or diamide derivative of the alkenically unsaturated monomer and the adduct of ethylene oxide or propylene oxide or amine adduct of these. In this way the alkenically unsaturated polymer adduct has two reactive unsaturated groups. Thus branching can occur between growing polymer chains producing unusual properties in the finished polymer. Using this technique care must be taken to avoid gel ball formation.

A particularly useful approach to these new block polymers is to react maleic anhydride or its derivatives after the degradation step. The term derivative here is used to denote many possible ester and/or amide combinations that can be formed with the anhydride and/or acid functionality of the maleic anhydride. For instance the anhydride functionality can be reacted with the hydroxyl of a glycol or polyoxyethylene polymer forming the maleate monoester. This would additionally have an acid functional group. Even further reaction on both ends of the glycol or polyoxyethylene group is possible because of its difunctional nature forming the dimaleate ester. Or conversely one can react the free acid functionality on the maleic group further and produce the meleate diester. Combinations of amines, ethoxylated amines, alcohols, or glycols can be used to form an infinite number of variations. It is only important to preserve the alkenic unsaturation of the maleic anhydride unit.

It has been found that maleic anhydride or its free acid or its isomerfumaric acid and/or its derivatives are the preferred modifiers because of their tendency to form polymers with other unsaturated moieties and not self polymerize as do many unsaturated monomers. This becomes extremely important in that the unsaturated bond formed by the incision of olefinic polymers with peroxide has a high activation energy. The required temperature for addition to this unsaturated group is above that which normal ethyleneically unsaturated monomers react. In fact, the use of most monomers results in at least some self-polymerization before they have a chance to blend in and react with the peroxide modified olefin if high temperatures are still present in the process. Therefore, processing of these other more reactive monomers becomes one wherein they must be present in and mixed with polyolefin degradation chains before the heat of initiation and reaction is reached. It is sometimes necessary to provide cooling, mixing and reheating steps (or zones with an extruder) with the addition of these other monomers. Although certainly possible in this process, the additional time and energy expended make the end polymer more expensive. By preferentially reacting with other unsaturated groups, maleic anhyride, maleic acid, fumaric acid, or their derivatives become the preferred modifiers.

If isotactic polypropylene is used as the starting polyolefin then the stereoregular function of the isotactic polypropylene becomes segmented along the chain with the insertion of the monomer or polymer units. This changes the highly crystalline structure of the polypropylene to one with substantially more elastomeric properties while still retaining some of its strength characteristics, properties that make it suitable for a number of applications. It is not necessary to reduce the chain length with chain incision to extremely low molecular weight segments to reduce crystallinity. It is only necessary to have some reduction per molecular unit as the different monomers used during the build up phase will also modify the crystallinity.

Of great value is the wetting ability possible with the polymers modified for increased hydrophilic character. This becomes important in the use of additives for other needed properties. For instance it has been found that the inclusion of diammonium phosphate and/or ammonium sulfate gives desireable flame retardant characteristics to polyolefins. However the addition of these materials to unmodified or only slightly modified isotactic polypropylene results in a mixture of non-homogenous character. This is due in part to the surface tension differences between the polypropylene and the more hydrophilic surface of the salt. By modifying with hydrophilic monomers, one can build a block polymer with increased hydrophilic character and the ability to load more of these salts while retaining homogenous qualities.

Of further value is the ability to incorporate higher levels of monomeric acid functionality than grafting reactions alone and still maintain polymer integrity. This along with the improved wetting ability allows one to incorporate multivalent oxides such as magnesium or calcium oxide into the polymer prior to its extrusion into an article. This reaction, previously known in the industry as aquaset when applied to ethylene methyacrylic acid copolymers is then performed and the oxides are post converted to hydroxides by water. Thus the formation of an ionically crosslinked polymer with thermoset qualities is achieved allowing even more possible end uses.

An example for the use of such novel block polymers is in carpet backing. Conventional carpet for flooring is made by tufting of a fiber, either filament or spun staple, through a backing material and then treating that backing with a mixture of latex (usually styrene butadiene or SBR latex), fillers such as calcium carbonate or clay, and surfactants to lower the viscosity and allow penetration into and through out the fiber bundle. Although care is taken to maintain high solids content, usually in the 70–75% range, there is still a large quantity of water that must be removed in the process. The removal of this water requires a considerable expenditure of energy and time and makes the whole process slow and energy consumptive.

It is therefore of great interest to extrude a backing directly onto the carpet. In this process water is not present and does not need to be removed. The preferred polymer for modification would be isotactic polypropylene a readily available polymer that is less expensive than the conventionally used materials and is itself already used in the manufacture of other components of the carpet.

Many methods have been attempted to directly extrude a polyolefin onto the back of carpet as the backing material. Problems with these prior techniques arise from the inherent crystalline nature of the isotactic polypropylene as well as the compatibility with nylon and/or other types of fibers.

Other methods to produce carpets have been tried such as lamination of film or foamed polymers with results that are generally either poorer in quality or higher in overall costs. The problem with these methods is in the use of dissimilar polymers and their lack of adhesion to the substrate.

Using the techniques outlined in this disclosure one is able to extrude the polymeric exudates directly onto carpet without the need for integral fusion. Even though isotactic polypropylene is used as starting material the end block polymer has improved adhesion and elastomeric properties thus giving the bond strengths and flexibility that are desirable in the market. Depending on the fiber used in the carpet one can tailor make the backing accordingly. For instance increasing hydrophilic character or adding surfactant like properties increases the surface penetration of the polymer into the carpet and thus provides more adhesion. If the carpet fiber is nylon one can add some acid functionality and form ionic crosslinking bonds with the residual amine function in the nylon fiber. If a more flexible backing is desired one can increase the degradation thereby lowering the level of stereoregular configuration thus giving even more elastomeric properties.

One of the major problems with the recycling of materials of construction is the use of dissimilar materials to manufacture a particular product. For instance commercially available carpet may contain nylon as the surface fiber, polypropylene as the backing material, styrene butadiene latex as the backing adhesive, magnesium or calcium carbonate as fillers and weighters, polyurethane foam as a laminated cushion, etc. After the useful life of the carpet it becomes more costly to recycle the carpet into its pure and individual components than to use virgin raw materials.

Carpet made from the above process can be reprocessed into other useful articles. The process herein described where modification is made of the polypropylene to a more hydrophilic polymer with increased elastomeric qualities provides a means to compatibilitze the dissimilar polymers used to make the carpet. Although the carpet may contain polymers as diverse as nylon and polypropylene as the carpet fibers, the backing made with the present process will cause a compabilizing effect with the dissimilar polymers. Thus the entire carpet can be reground and added back to an extruder wherein melt blending occurs and a polymeric composite suitable for manufacturing other articles is obtained. Further block polymerization as described can be used again to modify the recycled polymer melt. In this way a recycling program with much broader scope can be implemented.

EXAMPLE 1

An amount of 300 grams of polyethylene with a melt index of 20 was added to a flask fitted with an agitator, a thermometer, and a port for the introduction of liquids. The flask was heated to 130 degrees Centigrade until the mass could be agitated. An amount equal to 1.5 grams of cumene peroxide was introduced into the flask and heating was continued until a temperature of about 180 Centigrade was reached. At the point the melt index had dropped to approximately 2000 and no further decomposition was noticed. The entire product was then cooled to below 80 degrees Centigrade and 0.3 additional grams of cumene peroxide was added along with 30 grams of acrylic acid. The flask was heated back up to 135 degrees Centigrade and up to 200 degrees Centigrade over the course of 1 hour. The acid functionalized polyethylene was then poured out into a Teflon sheet and cooled. It was here noted that some crosslinking had occurred as evident by the formation of gel balls. The melt index was approximately 100 and the product exhibited an improved adhesion to a variety of substrates.

EXAMPLE 2

An amount of 300 grams of polypropylene with a melt index of 15 was added to a flask fitted with an agitator, a thermometer, and a port for the introduction of liquids. The flask was heated to 125 degrees Centigrade until the mass could be agitated. An amount equal to 1.5 grams of cumene peroxide was introduced into the flask and heating was continued until a temperature of about 175 degrees Centigrade was reached. At this point the melt index had dropped to approximately 1800 and no further reaction was indicated. The entire flask was cooled to 85 degrees Centigrade and 0.3 additional grams of cumene peroxide was added along with 40 grams of itaconic acid. The flask and contents were again heated to 125 degrees and up to 200 Centigrade over a period of 30 minutes. The acid functionalized polypropylene was then poured out onto a Teflon sheet and cooled. The material thus produced had a melt index of approximately 200 and improved elastomeric qualities. It also exhibited improved adhesion to a variety of substrates such as steel and wood when compared to the original starting polypropylene.

EXAMPLE 3

Recycled polypropylene was introduced into the feed throat of a twin screw extruder set up for multiple port additions. In the first zone past the feed throat 0.5% of 2,5-dimethyl-2,5 di(t-butylperoxy)hexane was added and chain incision was induced in the second heating zone set at 200 degrees C. until the melt index dropped from 10 to approximately 2000 at the die. At this point in the third zone set at 175 degrees C. was added an additional 0.002% of 2,5-dimethyl-2,5 di(t-butylperoxy)hexane and 6% of methacrylic acid. The fourth zone was set at 230 degrees Centigrade to facilitate total peroxide decomposition and polymer extrusion. At a point coinciding with the time it takes to move the exudate from the second addition port to the die the polymer chain growth became apparent as the melt index went down at the die to approximately 70. The polymer was thus recovered and shown to exhibit improved elastomeric properties and enhanced adhesion to metal and woven fabric samples it was extruded onto.

EXAMPLE 4

Recycled polypropylene was introduced into the feed throat of a twin screw extruder set up for multiple port additions. In the first zone past the feed throat 0.1% of 2,5-dimethyl-2,5 di(t-butylperoxy)hexane was added and chain incision was induced in the second heating zone set at 185 degrees C. until the melt index dropped from 10 to approximately 1500 at the die. At this point in the third zone set a t 185 degrees C. was added an additional 0.002% of 2,5-dimethyl-2,5di(t-butylperoxy)hexane and 6% of the pre-reacted condensation product of the stoichiometric amount for a 1 mole reaction of itaconic acid and trimethylol propane. The fourth zone was set at 230 degrees Centigrade of facilitate total peroxide decomposition and polymer extrusion. At a point coinciding with the time it takes to move the exudates from the second addition port to the die, the polymer chain growth became apparent as the melt index went down at the die to approximately 50. The polymer was thus recovered and shown to exhibit improved elastomeric properties and enhanced adhesion to metal and woven fabric samples it was extruded onto.

EXAMPLE 5

Recycled polypropylene was introduced into the feed throat of a twin screw extruder set up for multiple port additions. In the first zone past the feed throat 0.05% of 2,5-dimethyl-2,5 di(t-butylperoxy)hexane was added and chain incision was induced in the second heating zone set at 175 degrees C. until the melt index dropped from 10 to approximately 1200 at the die. At this point in the third zone set at 175 degrees C. was added an additional 0.001% of 2,5-dimethyl-2,5 di(t-butylperoxy)hexane and 5% of the pre-reacted condensation product of the stoichiometric amount for a 1 mole reaction of methacrylic acid and diethanolamine. The fourth zone was set at 230 degrees Centigrade to facilitate total peroxide decomposition and polymer extrusion. At a point coinciding with the time it takes to move the exudates from the second addition port to the die, the polymer chain growth became apparent as the melt index went down at the die to approximately 30. The polymer was thus recovered and shown to exhibit improved elastomeric properties and enhanced adhesion to metal and woven fabric samples it was extruded onto.

EXAMPLE 6

Recycled polypropylene was introduced into the feed throat of a twin screw extruder set up for multiple port additions. In the first zone past the feed throat 0.02% of 2,5-dimethyl-2,5 di(t-butylperoxy)hexane was added and chain incision was induced in the second heating zone set at 170 degrees C. until the melt index dropped from 10 to approximately 1000 at the die. At this point in the third zone set at 170 degrees C. was added an additional 0.001% of 2,5-dimethyl-2,5 di(t-butylperoxy)hexane and 3% of the pre-reacted condensation product of the stoichiometric amount for a 1 mole to 1 mole reaction of maleic anhydride and glycerin. The fourth zone was set at 230 degrees Centigrade to facilitate total peroxide decomposition and polymer extrusion. At a point coinciding with the time it takes to move the exudates from the second addition port to the die, the polymer chain growth became apparent as the melt index went down at the die to approximately 25. The polymer was thus recovered and shown to exhibit improved elastomeric properties and enhanced adhesion to metal and woven fabric samples it was extruded onto. In addition thus produced composition had improved wetting properties as evidenced by even greater increased in adhesion properties. Also the material exhibited improved appearance.

EXAMPLE 7

Recycled polypropylene was introduced into the feed throat of a twin screw extruder set up for multiple port additions. In the first zone past the feed throat 0.005% of 2,5-dimethyl-2,5 di(t-butylperoxy)hexane was added and chain incision was induced in the second heating zone set at 170 degrees C. until the melt index dropped from 10 to approximately 1000 at the die. At this point in the third zone set at 170 degrees C. was added an additional 0.001% of 2,5-dimethyl-2,5 di(t-butylperoxy)hexane and 4% of the pre-reacted condensation product of the stoichiometric amount for a 1 mole to 1 mole reaction of maleic anhydride and polyethylene glycol of 400 molecular weight. The fourth zone was set at 230 degrees Centigrade to facilitate total peroxide decomposition and polymer extrusion. At a point coinciding with the time it takes to move the exudates from the second addition port to the die, the polymer chain growth became apparent as the melt index went down at the die to approximately 20. The polymer was thus recovered and shown to exhibit improved elastomeric properties and enhanced adhesion to metal and woven fabric samples it was extruded onto. In addition the thus produced composition had improved wetting properties as evidenced by even greater increase in adhesion properties. Also the material exhibited improved appearance and greater overall strength.

EXAMPLE 8

Recycled polypropylene was introduced into the feed throat of a twin screw extruder set up for multiple port additions. In the first zone past the feed throat 0.002% of 2,5-dimethyl-2,5 di(t-butylperoxy)hexane was added and chain incision was induced in the second heating zone set at 175 degrees C. until the melt index dropped from 10 to approximately 900 at the die. At this point in the third zone set at 175 degrees C. was added an additional 0.001% of 2,5-dimethyl-2,5 di(t-butylperoxy)hexane and 3% of the pre-reacted condensation product of the stoichiometric amount for a 1 mole to 1 mole reaction of maleic anhydride and polyethylene glycol of 200 molecular weight. The fourth zone was set at 230 degrees Centigrade to facilitate total peroxide decomposition and polymer extrusion. At a point coinciding with the time it take to move the exudates from the second addition port to the die, the polymer chain growth became apparent as the melt index went down at the die to approximately 15. The polymer was thus recovered and shown to exhibit improved elastomeric properties and enhanced adhesion to metal and woven fabric samples it was extruded onto. In addition the thus produced composition had improved wetting properties as evidenced by even greater increase in adhesion properties. Also the material exhibited improved appearance and even greater overall strength.

EXAMPLE 9

Recycled polypropylene was introduced into the feed throat of a twin screw extruder set up for multiple port additions. In the first zone past the feed throat 0.002% of 2,5-dimethyl-2,5 di(t-butylperoxy)hexane was added and chain incision was induced in the second heating zone set at 175 degrees C. until the melt index dropped from 10 to approximately 900 at the die. At this point in the third zone set at 175 degrees C. was added an additional 0.001% of 2,5-dimethyl-2,5 di(t-butylperoxy)hexane and 4% of the pre-reacted condensation product of the stoichiometric amount for a 1 mole of 2 mole reaction of maleic anhydride and polyethylene glycol of 200 molecular weight. The fourth zone was set at 230 degrees Centigrade to facilitate total peroxide decomposition and polymer extrusion. At a point coinciding with the time it takes to move the exudates from the second addition port to the die, the polymer chain growth became apparent as the melt index went down at the die to approximately 20. The polymer was thus recovered and shown to exhibit improved elastomeric properties and enhanced adhesion to metal and woven fabric samples it was extruded onto. In addition the thus produced composition had improved wetting properties as evidenced by even greater increase in adhesion properties.

EXAMPLE 10

Recycled polypropylene was introduced into the feed throat of a twin screw extruder set up for multiple port additions. In the first zone past the feed throat 0.002% of 2,5-dimethyl-2,5 di(t-butylperoxy)hexane was added and chain incision was induced in the second heating zone set at 175 degrees C. until the melt index dropped from 10 to approximately 900 at the die. At this point in the third zone set at 175 degrees C. was added an additional 0.001% of 2,5-dimethyl-2,5 di(t-butylperoxy)hexane and 4% of the pre-reacted condensation product of the stoichiometric amount for a 2 mole to 1 mole reaction of maleic anhydride and polyethylene glycol of 200 molecular weight. The fourth zone was set at 230 degrees Centigrade to facilitate total peroxide decomposition and polymer extrusion. At a point coinciding with the time it takes to move the exudates from the second addition port to the die, the polymer chain growth became apparent as the melt index went down at the die to approximately 10. The polymer was thus recovered and shown to exhibit improved elastomeric properties and enhanced adhesion to metal and woven fabric samples it was extruded onto. The polymer also showed signs of cross-linking and perhaps some gel ball formation. The exudates was not as smooth in appearance as in pervious examples.

EXAMPLE 11

Recycled polypropylene was introduced into the feed throat of a twin screw extruder set up for multiple port additions. In the first zone past the feed throat 0.002% of 2,5-dimethyl-2,5 di(t-butylperoxy)hexane was added and chain incision was induced in the second heating zone set at 175 degrees C. until the melt index dropped from 10 to approximately 900 at the die. At this point in the third zone set at 210 degrees C. was added 4% of the pre-reacted condensation product of the stoichiometric amount for a 1 mole to 1 mole reaction of maleic anhydride and polyethylene glycol of 200 molecular weight. The fourth zone was set at 230 degrees Centigrade to facilitate total peroxide decomposition and polymer extrusion. At a point coinciding with the time it tales to move the exudates from the second addition port to the die, the polymer chain growth became apparent as the melt index went down at the die to approximately 15. The polymer was thus recovered and shown to exhibit improved elastomeric properties and enhanced adhesion to metal and woven fabric samples it was extruded onto. The exudates was smooth in appearance and proved to have excellent strength and elongation properties.

EXAMPLE 12

An amount of 150 grams of polypropylene with at melt index of 15 was added to flask fitted with an agitator, a thermometer, and a port for the introduction of liquids. The flask was heated to 150 degrees Centigrade until the mass could be agitated. An amount equal to 0.0075 grams pf 2,5-dimethyl-2,5 di(t-butylperoxy)hexane was introduced into the flask and heating was continued until a temperature of about 175 degrees Centigrade was reached. At this point the melt index had dropped to 1000 and no further reaction was indicated. The entire flask was cooled to 85 degrees Centigrade and 0.0075 additional grams of 2,5-dimethyl-2,5di(t-butylperoxy)hexane was added along with 150 grams of the pre-reacted compound using the stoichiometric amount for a 1 mole to 1 mole reaction of maleic anhydride and polyethylene glycol of 200 molecular weight. The flask and contents were again heated to 125 degrees and up to 200 degrees Centigrade over a period of 30 minutes. The hydrophilic polymer thus produced was then poured out onto a Teflon sheet and cooled. The material had some unusual properties such as water dispersibility and maybe suitable for coatings and/or adhesive additives alone or in combination with other additives.

EXAMPLE 13

Recycled polypropylene was introduced into the feed throat of a twin screw extruder set up for multiple port additions. In the first zone past the feed throat 0.002% of 2,5-dimethyl-2,5 di(t-butylperoxy)hexane was added and chain incision was induced in the second heating zone set at 175 degrees C. until the melt index dropped from 10 to approximately 900 at the die. At this point in the third zone set at 210 degrees C. was added 2% of the pre-reacted condensation product of the stoichiometric amount for a 1 mole to 1 mole reaction of maleic anhydride and diethylene glycol. The fourth zone was set at 230 degrees Centigrade to facilitate total peroxide decomposition and polymer extrusion. At a point coinciding with the time it takes to move the exudates from the second addition port to the die, the polymer chain growth became apparent as the melt index went down at the die to approximately 40. The polymer was thus recovered and shown to exhibit improved elastomeric properties and enhanced adhesion to metal and woven fabric samples it was extruded onto. The exudate was smooth in appearance and proved to have excellent strength and elongation properties.

EXAMPLE 14

In order for a material to form a carpet backing it must exhibit properties of flexibility and rigidity as well as holding the fibers together both into and on the backing and together as individual bundles. There are two tests that are used to show these effects. They are referred to in the industry as tuft bond and Velcro. The tuft bond test is done using an instrument such as an Instron to measure the amount of force necessary to pull one of the fiber bundles out of and sway from the backing measured in pounds. The Velcro test is performed by rolling a Velcro covered wheel back and forth over a given area of the carpet. The area thus rolled is compared with standards from 5 to 1 rating excellent to poor. Using these tests the exudates of several examples above were tried as carpet backing binders with the following results:

TABLE 1

Tuft Bond and Velcro Test Results for Materials Produced in the Indicated Examples

| EXAMPLE | TUFT BOND (LBS) | VELCRO |
|---|---|---|
| 3 | 12 | 2 |
| 4 | 13 | 2 |
| 5 | 9 | 3 |
| 6 | 15 | 3 |
| 7 | 20 | 4 |
| 8 | 18 | 4.5 |
| 9 | 14 | 4.5 |
| 10 | 11 | 3 |
| 11 | 20 | 5 |
| 13 | 25 | 5 |

By comparison of the results of this chart and the properties of the alkenically unsaturated monomers used to build the block polymers it appears that both acid functionality and hydrophilic character are needed in order to achieve both of the desirable features.

EXAMPLE 15

In order for a polyolefin to be suitable in an application such as carpet some type of flame retardant characteristics must be built in. By trial and error it was determined that ammonium salts of phosphates and sulfates were adequate for this at loadings of 10 to 15% based on the weight of the carpet. Using a 15% loading the tuft bond and Velcro's were run again with the following results:

TABLE 2

Tuft Bond and Velcro Test Results for Materials Produced in the Indicated Examples

| EXAMPLE | TUFT BOND (LBS) | VELCRO |
|---|---|---|
| 3 | 8 | 1 |
| 4 | 9 | 1 |
| 5 | 5 | 1 |
| 6 | 12 | 2 |
| 7 | 18 | 4 |
| 8 | 17 | 4 |
| 9 | 14 | 2 |
| 10 | 8 | 2 |
| 11 | 18 | 4.5 |
| 13 | 22 | 5 |

By comparison of the results of this chart it appears that hydrophilic substitution as the alkenically unsaturated groups in the finished block olefins give better results when loading these flame retardant materials. The exudates were both more homogeneous and more consistent.

EXAMPLE 16

To samples of the material produced in example 12 was added 15% each of the divalent metal oxides of calcium and magnesium. The materials were blended into the hot material thoroughly and then allowed to cool. The hydrophilic nature of the material of example 16 allowed this to be done easily. The resulting composites where steamed for 10 minutes to allow water vapor to convert the oxides to hydroxide bases and allowed to cool. The resulting composites were ionically bond more like a set material as evidenced by their increased in stiffness and resistance to flow even after heating to 90 degrees Centigrade.

EXAMPLE 17

Several of the carpet samples of Example 15 were taken and ground up and fed to the feed port of a twin screw extruder. These carpet samples contained nylon and polypropylene in the carpet fiber, polypropylene in the carpet backing, and the block exudates of this invention with their flame retardant additives. The exit temperature was set at 250 degrees Centigrade. The resultant composites were homogeneous in nature and exhibited many desirable characteristics such as strength and flexibility. Foaming agents were added and foamed sheet was produced having more desirable flexibility and recovery than comparable sheets of polystyrene or polyurethanes.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A process for converting polyolefin homopolymers into block polymers or copolymers having substantially different properties from the original polyolefin homopolymer such process comprising the steps of
   introducing said polyolefin homopolymer into an extruder;
   mixing a free radical generator with said polyolefin homopolymer to form a mixture at room temperature for free radical formation;
   bringing the mass of said mixture up to a temperature of between about 175° C. to 220° C.;
   inducing chain degradation of said polyolefin homopolymer in said mixture by said free radical formation caused by said free radical generator to form degraded polymer with a melt index greater than 50;
   second mixing alkenically unsaturated monomers or polymer segments with said degraded polymer to form a second mixture;
   adjusting the temperature of said second mixture to between about 100° C. to 250° C.; and
   forming said block polymer or copolymer from said second mixture.

2. The process for converting polyolefin homopolymers into block polymers or copolymers having substantially different properties from the original polyolefin homopolymer of claim 1 wherein said polyolefin homopolymer is polyethylene.

3. The process for converting polyolefin homopolymers into block polymers or copolymers having substantially different properties from the original polyolefin homopolymer of claim 1 wherein said polyolefin homopolymer is polypropylene.

4. The process for converting polyolefin homopolymers into block polymers or copolymers having substantially different properties from the original polyolefin homopolymer of claim 3 wherein said polyolefin homopolymer is isotactic polypropylene.

5. The process for converting polyolefin homopolymers into block polymers or copolymers having substantially different properties from the original polyolefin homopolymer of claim 1 wherein said free radical generator is an organic peroxide.

6. The process for converting polyolefin homopolymers into block polymers or copolymers having substantially different properties from the original polyolefin homopolymer of claim 5 wherein said organic peroxide is selected from the group consisting of alpha, alpha-bis(t-butylperoxy) diisopropylbenzene, bis-(2,1,1-dimethylethyl) peroxyisopropyl)benzene, dicumyl peroxide, 2,5-dimethyl-2,5 di(t-butylperoxy)hexane, 2,5-dimethyl-2,5-di(t-butyleperoxy)hexyne-3, di-t-butyl peroxide, di-t-amyl peroxide, 1,1-di(t-butylperoxy)-3,3,5 trimethylcyclohexane, ethyl-3,3-di(t-amylperoxy)butyrate, ethyl-3,3-di(t-butylperoxy)butyrate, n-butyl-4,4-bis(t-butylperoxy) valerate, t-amylperoxy acetate, t-amylperoxy acetate, t-amylperoxy benzoate, t-butylcumyl peroxide, t-butyl peroxy acetate, and t-butyl peroxy benzoate.

7. The process for converting polyolefin homopolymers into block polymers or copolymers having substantially different properties from the original polyolefin homopolymer of claim 1 wherein said alkenically unsaturated monomer is selected from the group consisting of acrylic acid, methacrylic acid, ethacrylic acid, itaconic acid, maleic acid, maleic anhyride, and fumaric acid.

8. The process for converting polyolefin homopolymers into block polymers or copolymers having substantially different properties from the original polyolefin homopolymer of claim 1 wherein said alkenically unsaturated monomer is selected from the group consisting of ethyl acrylate, methyl methacrylate, methoxy methyl methacrylate, butyl acrylate, and chloroethyl methacrylate.

9. The process for converting polyolefin homopolymers into block polymers or copolymers having substantially different properties from the original polyolefin homopolymer of claim 1 wherein said alkenically unsaturated monomer is a vinyl carboxylate.

10. The process for converting polyolefin homopolymers into block polymers or copolymers having substantially different properties from the original polyolefin homopolymer of claim 1 wherein said alkenically unsaturated monomer is an unsaturated ketone or aldehyde.

11. The process for converting polyolefin homopolymers into block polymers or copolymers having substantially different properties from the original polyolefin homopolymer of claim 1 wherein said alkenically unsaturated monomer is an unsaturated ester.

12. The process for converting polyolefin homopolymers into block polymers or copolymers having substantially different properties from the original polyolefin homopolymer of claim 1 wherein said alkenically unsaturated monomer is a mono ester derivative of maleic anhydride formed by the reaction of the anhydride functionality of the maleic anhydride with an alcohol or hydroxyl containing compound.

13. The process for converting polyolefin homopolymers into block polymers or copolymers having substantially different properties from the original polyolefin homopolymer of claim 1 wherein said alkenically unsaturated monomer is a mono amide derivative of maleic anhydride formed by the reaction of the anhydride functionality of the maleic anhydride acid functionality with a primary or secondary amine.

14. The process for converting polyolefin homopolymers into block polymers or copolymers having substantially different properties from the original polyolefin homopolymer of claim 12 wherein said mono ester derivative of maleic anhydride containing additional hydroxyl groups is further reacted with additional maleic anhydride to form di- or polymaleate esters.

15. The process for converting polyolefin homopolymers into block polymers or copolymers having substantially different properties from the original polyolefin homopolymer of claim 13 wherein the mono amide derivative of maleic anhydride containing additional amine or hydroxyl groups is further reacted with additional maleic anhydride to form the di- or polymaleamides.

16. The process for converting polyolefin homopolymers into block polymers or copolymers having substantially different properties from the original polyolefin homopolymer of claim 12 wherein the mono ester derivative of maleic anhydride containing unreacted carboxylic functionality on the maleic moiety is further reacted with other hydroxyl compounds to form the maleate diester or polyesters.

17. The process for converting polyolefin homopolymers into block polymers or copolymers having substantially different properties from the original polyolefin homopolymer of claim 13 wherein the mono amide derivative of maleic anhydride containing unreacted carboxylic functionality on the maleic moiety is further reacted with other amine compounds to form maleate diamides or polyamides.

18. The process for converting polyolefin homopolymers into block polymers or copolymers having substantially different properties from the original polyolefin homopolymer of claim 1 further comprising the step of lowering the temperature of said second mixture to a temperature of between about 90° C. to 150° C.

* * * * *